United States Patent [19]

Propster et al.

[11] 4,401,453
[45] Aug. 30, 1983

[54] PREHEATING GLASS BATCH

[75] Inventors: Mark A. Propster, Gahanna; Stephen Seng, Bladensburg; Charles M. Hohman, Granville, all of Ohio

[73] Assignee: Owens-Corning Fiberglas Corporation, Toledo, Ohio

[21] Appl. No.: 373,465

[22] Filed: Apr. 30, 1982

[51] Int. Cl.³ .............................................. C03B 1/00
[52] U.S. Cl. .......................................... 65/27; 65/134; 65/335; 165/1; 165/88
[58] Field of Search ............... 65/27, 134, 335; 165/1, 165/88

[56] References Cited

U.S. PATENT DOCUMENTS

| 2,592,783 | 4/1952 | Aspegren | 165/88 X |
| 2,872,386 | 2/1959 | Aspegren | 165/88 X |
| 4,207,943 | 6/1970 | Gardner et al. | 165/1 |
| 4,319,903 | 3/1982 | Hohman et al. | 65/27 |
| 4,338,113 | 7/1982 | Hohman et al. | 65/27 |

Primary Examiner—Arthur D. Kellogg
Attorney, Agent, or Firm—Ronald C. Hudgens; Patrick P. Pacella

[57] ABSTRACT

A means and method for preheating glass batch is disclosed. A media heated with furnace exhaust gases is used to preheat the glass batch. This invention includes a way to clean furnace exhaust gas condensate from the surface of the media.

11 Claims, 2 Drawing Figures

PREHEATING GLASS BATCH

TECHNICAL FIELD

This invention relates to a process for preheating glass batch which is then fed to a glass-melting furnace.

BACKGROUND ART

One method for preheating glass batch involves feeding cold particulate glass batch raw materials into one end of a rotating heat-transfer drum, and feeding hot media of larger particle size than the batch particles into the other end of the heat transfer drum. The glass batch moves in direct and immediate physical contact with the heated media, with the batch flowing from the cold end to the hot end of the drum and the media flowing from the hot end to the cold end of the drum. The heated particulate batch is removed from the hot end of the drum, and the cooled media is removed from the cold end of the drum. Preferably, the heat transfer media is of a durable material and can be comprised of glass batch agglomerates, glass, ceramic material, steel, stainless steel, aluminum, or gravel. The media can be spherical in shape, and a useable example of such media is spherical ceramic balls. The media can be heated with an external burner or preferably heated by direct contact with exhaust gases from a glass melting furnace.

When the media is heated with furnace exhaust gases, a condensate often collects on the surface of the media. This condensate usually is cleaned off or removed when the media is tumbled with the batch in the rotating drum. Frequently, however, tumbling the media does not remove all the condensate either because the dwell time in the drum is too short or because the coating of condensate is too heavy.

DISCLOSURE OF INVENTION

According to this invention, we have developed a method and means for cleaning the condensate from the surface of the media. The key to our invention is to employ a separate cleaning drum between the heat transfer drum and the preheat hopper used to heat the media. The cleaning drum is rotatable about an axis and provides sufficient residence time for cleaning the media. The tumbling of the media on itself will provide the abrasion needed to remove the condensate from the media. The abraided particulate condensate then may be recycled back to the heat transfer drum for preheating or charged directly to a glass melting furnace.

BEST MODE OF CARRYING OUT INVENTION

Our invention includes durable heat transfer media formed of glass, ceramic, steel, stainless steel, aluminum, gravel or the like which are positioned in a preheat hopper and preheated, preferably by exhaust gases from a glass making furnace.

The heated media is introduced into one end of a container such as a cylindrical drum rotatable on an inclined axis. Concurrently, glass batch to be heated is introduced into the other end of the drum. The hot media flows in one general overall direction through the drum and the batch flows in a generally opposite direction through the drum. The media serves to heat the batch and the batch serves to cool the media. The cooled media is recycled back to the preheat hopper, the preheated batch is fed to the furnace batch feed mechanism.

Before the cooled media is recycled back to the preheat hopper, it is introduced to a cleaning drum rotatable on an axis. There the media tumble over themselves as they move through the cleaning drum. The cleaned media is removed from one end of the drum and the condensate from the other end.

Figure 1:
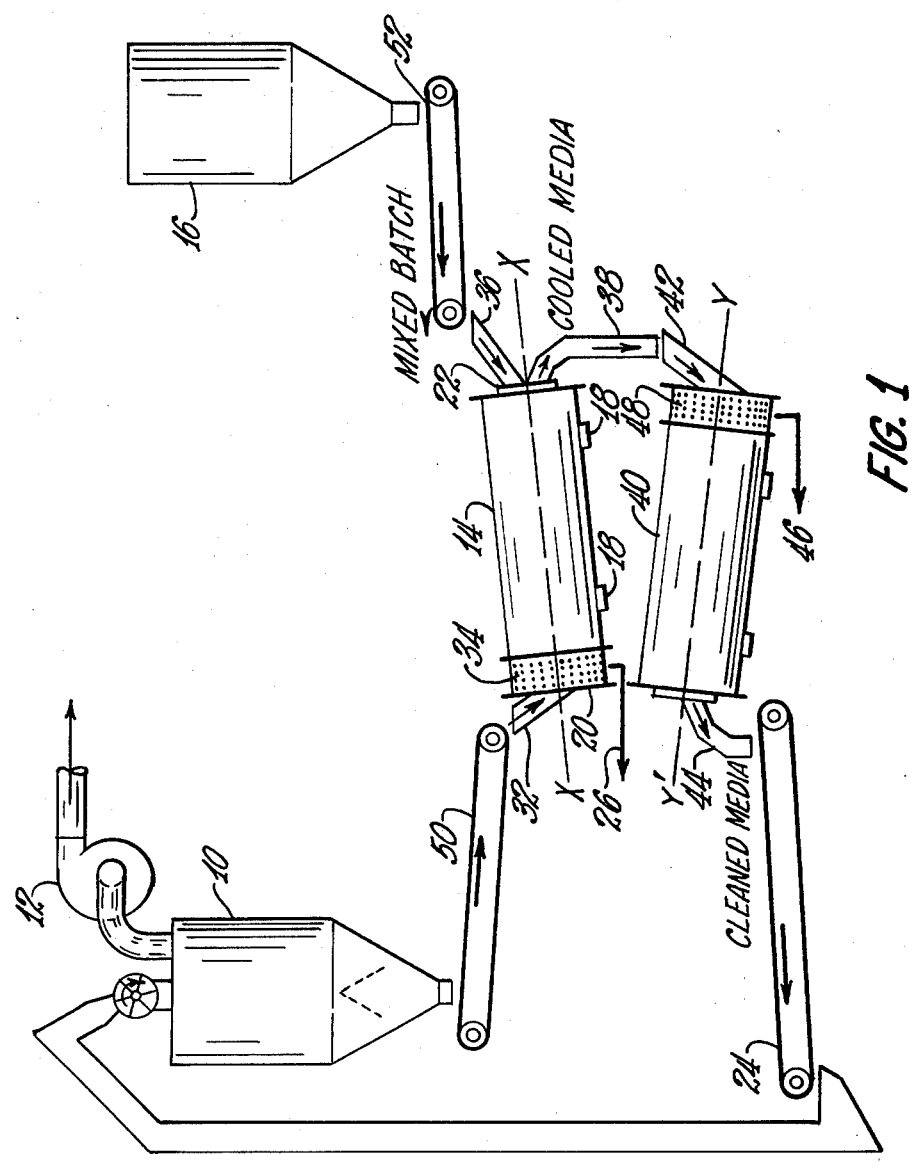
FIG. 1 is a flow diagram of this invention including a rotary cleaning drum.

In FIG. 1, heat transfer media may be heated with flue gases at a temperature normally ranging from 482° to 677° C. from a glass melting furnace (not shown) in preheat hopper 10. The flue gases are introduced into the lower part of preheat hopper 10 and the media is introduced into the upper part of preheat hopper 10. The flow of gases and media are countercurrent to each other. The media exits through the bottom of preheat hopper 10 and the flue gases exit through the top of preheat hopper 10. A blower or fan 12 is shown to pull the exhaust gases from preheat hopper 10 or to maintain a negative pressure in the hopper. The media may be heated to a temperature at or near the temperature of the flue gases.

The hot media then is fed to one end of heat exchange drum 14 by a conveyor 50. Concurrently, particulate glass batch raw materials are fed by conveyor 52 and a screw feeder (not shown) from mixed batch storage 16 to the other end of drum 14. Drum 14 is rotated around the axis x—x by a motor and drive (not shown) on rollers 18.

Centrally arranged stationary end parts at 20 and 22 form inlet and outlet conduits communicating with the inside of the drum. After the cooled media is discharged from the drum via conduit 38, it is introduced to cleaning drum 40 via conduit 42. Drum 40 is rotated about the axis Y—Y' by a motor and drive (not shown). After the cleaned media is discharged from drum 40 via conduit 44, it is returned to preheat hopper 10 via conveyor 24. Removed condensate is fed to a glass melting furnace or heat transfer drum 14 via stream 46.

Hot batch from drum 14 is fed to a glass melting furnace via stream 26.

Hot media is fed to drum 14 through conduit 32 and hot batch is discharged through screen 34. Cold batch is fed through conduit 36 and cold media is discharged through conduit 38. The rotation of the drum and baffles (not shown) cause the media and batch to tumble in direct immediate physical contact with each other.

Cylindrical container 14 is inclined at an angle. In the preferred embodiment, the batch charging end of the container is elevated above the media charging end. While the angle can vary widely, generally the drum will form an acute angle with a horizontal line no greater than about 45° and typically less than 15°. Preferably, the angle is less than 5°.

When the batch charging end of container 14 is elevated above the media charging end, hot batch is discharged at the lower end of container 14 through openings that allow the batch to pass freely through but that prevent the media from passing. When the media charging end of container 14 is elevated above the batch charging end, cold media is discharged at the lower end of container 14 through means that allow the media to pass freely through but that prevent the batch from passing through.

While the tumbling of the media and batch occurs through agitation from the baffles and rotation of the drum, movement of the batch and media through the drum is believed to occur in the following manner. The media and batch form gradients in the drum and generally flow downhill in a direction along the gradients and in opposite directions. The batch and media tumble and move over each other as they flow from the high end to the low end of the pile of material in the container.

Figure 2:
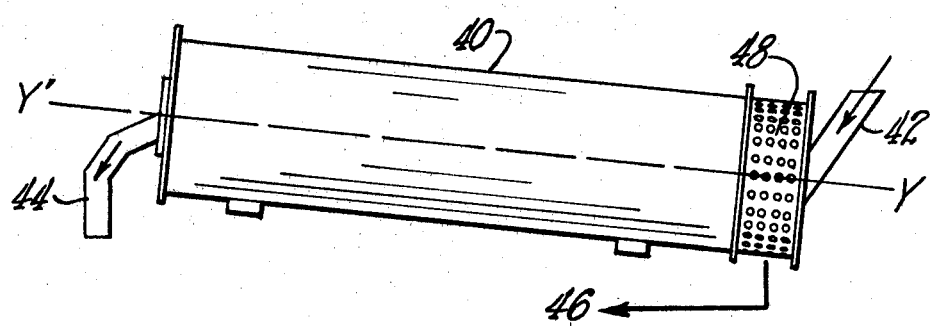
FIG. 2 illustrates the rotary cleaning drum in more detail.

FIG. 2 shows cleaning drum 40 in more detail. Cooled media is fed to drum 40 through conduit 42. The rotation of the drum and baffles (not shown) causes the media to tumble in direct immediate physical contact with each other. Drum 40 may be inclined at an angle with the media charging end lowered below the media removal end. While the angle can vary widely, generally drum 40 will form an acute angle with a horizontal line no greater than about 45° and typically less than 15°. Preferably, the angle is less than 5°.

In the preferred embodiment, the media charging end of container 40 is lowered. When the media charging end of container 40 is lowered, condensate is discharged at the lower end of container 40 through openings that allow the condensate to pass freely through but that prevent the media from passing. When the media charging end of container 40 is elevated, the cold media is discharged at the lower end of container 40 through means that allow the media to pass freely through but that prevent the condensate from passing through.

While the Figures show the preferred embodiment of this invention with the media charging end and condensate removal end being at the lower end of container 40, it is possible for the media charging end to be elevated above the condensate discharge end of container 40. In this embodiment, cleaned media may be removed from either end of container 40.

The means for removing the media from either container 14 or 40 may include a scroll (not shown) attached to the container and extending into the container. Normally, the scroll has openings of a size that allows batch or condensate to pass freely through the openings but that prevent the media from passing through the openings. The batch or condensate falls through the voids in the scroll into the interior of the container without being discharged with the media. As the scroll rotates with the container, the media moves along a spiral path to the media exit of the container.

Removed condensate leaves drum 40 through screen 48.

INDUSTRIAL APPLICABILITY

EXAMPLE I

Trials were conducted with both spherical and non-spherical agglomerates of varying sizes. It was determined through this testing that the media should be spherical in shape and closely matched in diameter to prevent batch and media flow problems. Preferably, the media will have a shape factor ranging between 0.9 and 1.0. The media, if closely matched, could have a wide diameter range, but the optimum size should be approximately one inch in diameter.

Hot trials have been carried out with media heated to 427° C. The media, in turn, heated the batch to a temperature of 388° C. for a heat transfer efficiency over 90%. With this invention, we expect to be able to heat glass batch to a temperature of 649° C. However, long range, the factors affecting this invention will be the melting temperature of the media and batch being heated.

Any glass batch can be preheated by this invention with bottle or container glass, flat glass and fiber glass batches being the most common.

The batch formulation used was a standard wool glass batch composition. Textile batch, however, also can be preheated by this invention.

| Ingredient | Weight Percent |
|---|---|
| Central Silica Sand | 40.96 |
| 5 Mol Borax | 10.77 |
| Burnt Dolomite | 4.68 |
| Soda Ash | 14.71 |
| Barytes | 3.02 |
| Nepheline Syenite | 11.85 |
| Spore Limestone | 7.94 |
| Carbon | 0.05 |
| Cullet | 6.00 |

The hot wool glass batch then can be fed to a glass melting furnace.

A 20"×100" drum was constructed for cleaning the media. The actual media evaluated were ceramic balls. Typically, 500 to 1,200 pounds of glass balls are in drum 40 at any given time with a media throughput of 1,000 pounds per hour.

The cold model data for the media was determined as follows:

| Angle of Incline | Media % of Drum Volume | Dwell Time (minutes) in Drum 40 | RPM |
|---|---|---|---|
| 0° | 20 | 29 | 40 |
| 2° | 22 | 32 | 40 |
| 4° | 39 | 57 | 40 |
| 6° | 49 | 72 | 40 |

EXAMPLE II

In one run, ceramic balls approximately one inch in diameter were exposed to furnace exhaust gases for 100 hours. The glass melted in the furnace was a typical wool glass batch such as that described in Example I. The gases had an inlet temperature of about 650° C. A sample of the "dirty" balls were rotated with a sample of the raw glass batch in a drum such as that described in Example I. The "dirty" balls were cleaned of essentially all condensate in about 120 minutes.

A similar run was carried out except that only "dirty" balls were in the drum. After 90 minutes of rotation, essentially all of the condensate was removed from the balls.

Similar experiments were carried out for 100 hours of exposure, except that exhaust gases from a textile melting furnace and raw textile batch were employed. After 240 minutes, the "dirty" balls with raw textile batch present in the drum were only 75 percent clean. When no textile batch was present in the drum, the "dirty" balls were cleaned in 120 minutes.

The level of condensate on the media after 100 hours exposure to exhaust gases from a glass melting furnace corresponds to approximately 15 passes through a cleaning drum. Accordingly, the cleaning drum design would have to provide more than 8 minutes dwell time in order to insure 120 minutes of cleaning time.

Textile batch contains clay which hindered the abraiding or cleaning action of the balls. Wool batch which typically contains up to 50 or 60% coarse sand seems to aid the cleaning. The cleaning drum of this invention assures the removal of essentially all the condensate in a shortened period of time. If desired, a grinding agent such as coarse sand may be added to the cleaning drum to enhance the cleaning rate.

The condensate from the furnace exhaust gases generally appears on the media as a glassy glaze. While the uniformity may vary and a buildup of condensate may occur, there usually is a uniform coating of the condensate on the media. The coating removed by the tumbling of the media over each other frequently resembles ground glass. The friable material recovered in the experiments of this invention were particles of borosilicate glass.

We claim:

1. A process for producing glass by charging to a melting furnace and melting therein a particulate glass batch, including the steps of:
    heating durable heat transfer media, larger in particle size than the glass batch, by direct contact with exhaust gases from the melting furnace; wherein the direct contact with furnace exhaust gases coats the media with a condensate;
    using the hot media to preheat the particulate glass batch and thereby cool the media;
    introducing the cool media into a cleaning container rotatable about an axis; and
    rotating the cleaning container, during rotation the media tumbling and moving over each other in cleaning relationship to remove the condensate from the media by abrasion of the media against each other.

2. A process for producing glass by charging to a melting furnace and melting therein a particulate glass batch, including the steps of:
    heating durable heat transfer media, larger in particle size than the glass batch, by direct contact with exhaust gases from the melting furnace wherein the direct contact with furnace exhaust gases coats the media with a condensate;
    introducing the hot media into a heat transfer container rotatable about an axis;
    introducing the particulate glass batch into the container;
    rotating the container, during rotation the batch and media tumbling and moving over each other in heat transfer relationship;
    discharging the cold media from the heat transfer container;
    introducing the cold media into a cleaning container rotatable about an axis; and
    rotating the cleaning container, during rotation the media tumbling and moving over each other in cleaning relationship to remove the condensate from the media by abrasion of the media against each other.

3. A process according to claim 2 including the step of introducing a cold media into the lower end of an inclined cleaning container.

4. A process according to claim 3 including the step of removing cleaned media from the elevated end of the inclined container.

5. A process according to claim 3 including the step of discharging removed condensate at the lower end of the inclined cleaning container through openings that allow the condensate to pass freely through but that prevent the media from passing.

6. An apparatus for preheating particulate glass batch comprising:
    means for heating durable heat transfer media by direct contact with exhaust gases from a melting furnace wherein the direct contact with furnace exhaust gases coats the media with a condensate;
    means for using the hot media to preheat the particulate glass batch and thereby cool the media;
    a cleaning container rotatable about an axis;
    means for introducing the cool media into the cleaning container;
    means for rotating the cleaning container; and
    means associated with the cleaning container so that the media tumble and move over each other in cleaning relationship to remove the condensate from the media by abrasion of the media against each other.

7. An apparatus according to claim 6 wherein the media are ceramic balls.

8. An apparatus according to claim 6 including means for introducing the cold media into the lower end of an inclined cleaning container.

9. An apparatus according to claim 8 including means for removing cleaned media from the elevated end of the inclined cleaning container.

10. An apparatus according to claim 8 including means for discharging removed condensate at the lower end of the inclined cleaning container through openings that allow the condensate to pass freely through but that prevent the media from passing.

11. An apparatus for preheating particulate glass batch comprising:
    means for heating durable heat transfer media by direct contact with exhaust gases from a melting furnace wherein the direct contact with furnace exhaust gases coats the media with a condensate;
    a heat transfer container rotatable about an axis;
    means for introducing the hot media, larger in particle size than the glass batch, into the container;
    means for introducing particulate glass batch into the container;
    means for discharging the cold media from the heat transfer container;
    a cleaning container rotatable about an axis;
    means for introducing the cold media into the cleaning container;
    means for rotating the cleaning container; and
    means associated with the cleaning container so that the media tumble and move over each other in cleaning relationship to remove the condensate from the media by abrasion of the media.

* * * * *